(12) United States Patent
Mace et al.

(10) Patent No.: US 10,896,440 B2
(45) Date of Patent: Jan. 19, 2021

(54) OFFSITE DATA ANALYSIS FOR APPLIANCES

(71) Applicant: EMC IP Holding Company LLC, Hopkinton, MA (US)

(72) Inventors: Donald Mace, Hopkinton, MA (US); Xiaoye Jiang, Shrewsbury, MA (US); Gil Shneorson, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 455 days.

(21) Appl. No.: 14/998,139

(22) Filed: Dec. 23, 2015

(65) Prior Publication Data

US 2017/0186034 A1 Jun. 29, 2017

(51) Int. Cl.
| | | |
|---|---|---|
| *G06Q 30/02* | (2012.01) | |
| *H04L 29/08* | (2006.01) | |
| *G06F 9/455* | (2018.01) | |
| *G06F 11/34* | (2006.01) | |
| *H04L 12/24* | (2006.01) | |
| *G06F 11/30* | (2006.01) | |
| *H04L 12/26* | (2006.01) | |

(52) U.S. Cl.
CPC ..... *G06Q 30/0251* (2013.01); *G06F 9/45558* (2013.01); *G06F 11/3006* (2013.01); *G06F 11/3433* (2013.01); *G06F 11/3438* (2013.01); *G06F 11/3452* (2013.01); *H04L 41/5032* (2013.01); *H04L 43/0876* (2013.01); *H04L 67/10* (2013.01); *H04L 67/22* (2013.01)

(58) Field of Classification Search
USPC .............................. 718/102; 455/406; 705/14
See application file for complete search history.

(56) References Cited

U.S. PATENT DOCUMENTS

| | | | |
|---|---|---|---|
| 8,352,608 B1 | 1/2013 | Keagy | |
| 9,363,248 B1* | 6/2016 | Hughes | ................... H04L 12/66 |
| 9,465,684 B1 | 10/2016 | Carter | |
| 9,699,167 B1 | 7/2017 | Tovino | |
| 2012/0304179 A1* | 11/2012 | Devarakonda | ......... G06Q 10/00 718/102 |
| 2013/0061267 A1 | 3/2013 | Cansino | |
| 2013/0174168 A1* | 7/2013 | Abuelsaad | ............ G06F 9/5072 718/102 |
| 2014/0282851 A1 | 9/2014 | Miller | |
| 2015/0050912 A1* | 2/2015 | Henry, Jr. | .......... G06Q 30/0239 455/406 |
| 2015/0248402 A1 | 9/2015 | Patterson, III | |
| 2015/0295808 A1* | 10/2015 | O'Malley | ............... H04L 47/22 709/224 |
| 2015/0379167 A1 | 12/2015 | Griffith | |
| 2016/0098654 A1 | 4/2016 | Bhattacharjee | |
| 2016/0140362 A1 | 5/2016 | Aghili | |
| 2016/0364250 A1 | 12/2016 | Seibert | |

* cited by examiner

*Primary Examiner* — Afaf Osman Bilal Ahmed
(74) *Attorney, Agent, or Firm* — Van Pelt, Yi & James LLP

(57) ABSTRACT

Usage and performance data from a plurality of installed appliances is received via a network, a different corresponding subset of said appliances being associated with each of a plurality of customers. Said usage and performance data across customers is analyzed to identify capacity utilization related trends. A targeted offer is determined for a given customer, based at least in part on said analysis across customers and the given customer's own usage and performance data.

15 Claims, 9 Drawing Sheets

FIG. 2

OFFSITE DATA ANALYSIS FOR APPLIANCES

BACKGROUND OF THE INVENTION

Vendors have provided systems that provide computing, storage, network, management, and/or other capabilities in a single box or module. For example, "hyper-converged" appliances may be provided, wherein hyper-converged appliances are defined as appliances that use virtualization technology to provide access to one or more such capabilities in a single appliance. Such appliances have provided an all-in-one solution to small, medium, and large enterprises, for example, which otherwise may not have had the resources required to buy and support separate servers to perform each function.

Improvements in user interface, customer service, and user experience in consumer and/or retail technology such as cellular phones and tablets has revealed a need to improve user interface, customer service, and user experience enterprise technology.

BRIEF DESCRIPTION OF THE DRAWINGS

Various embodiments of the invention are disclosed in the following detailed description and the accompanying drawings.

FIG. 2 is an illustration of an appliance marketplace.

DETAILED DESCRIPTION

Figure 1:
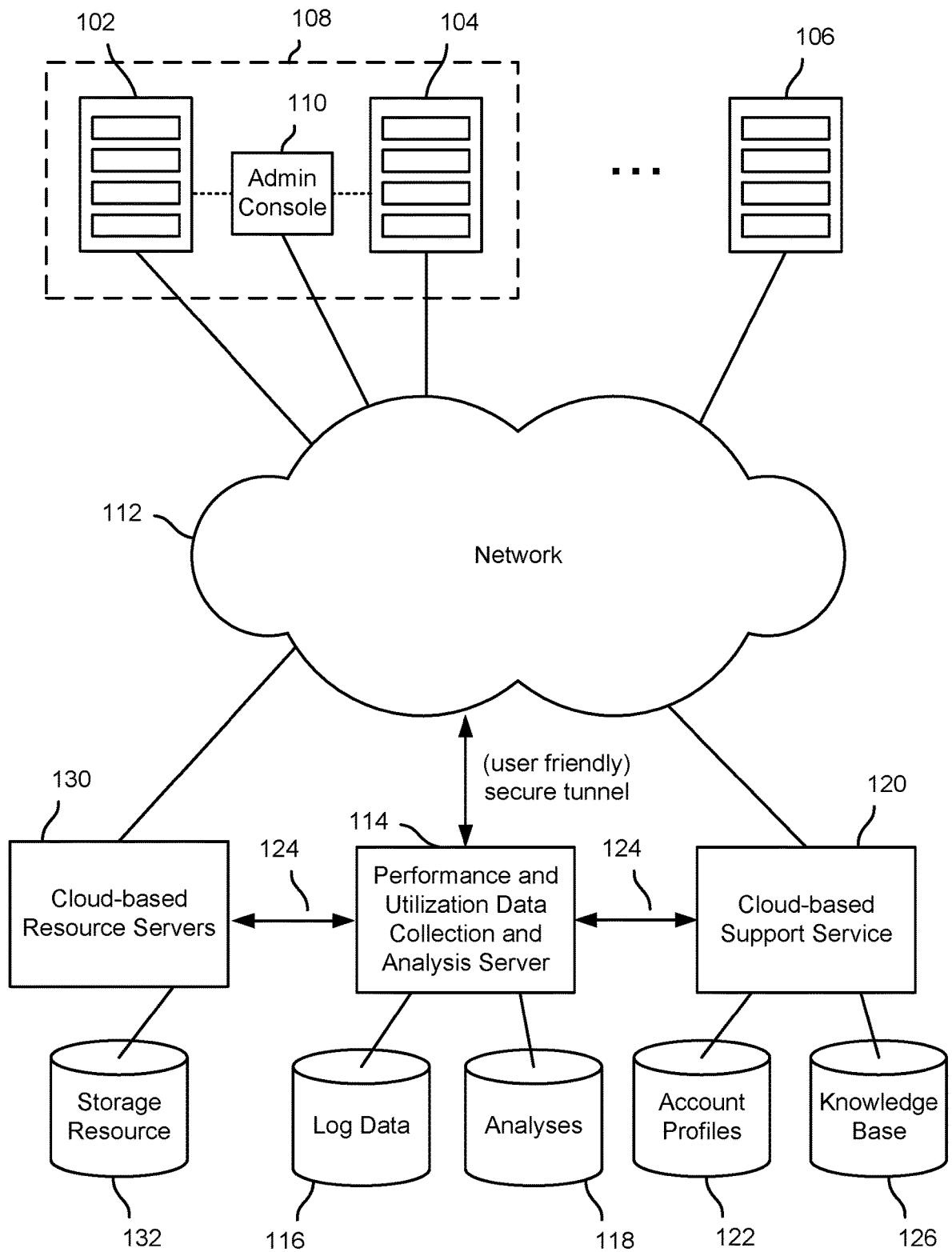
FIG. 1 is a block diagram illustrating an embodiment of an appliance and marketplace environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Analyzing aggregate data from a plurality of customers and comparing to customer data offsite is disclosed.

An appliance may transfer data on appliance performance, capacity utilization, and/or end user product interaction to a vendor and/or cloud.

Analysis of this data can be used to seed an appliance marketplace with targeted service offerings for customers. For example, based on capacity utilization trends a user/customer may be offered the featured market option to purchase more appliances, or the option to migrate some workload to the cloud. Even a vendor service engagement where vendor support engineers can perform actions for a user may be offered in the appliance marketplace based on data analysis of the customer's environment offsite from the customer's appliance.

In one embodiment, an enterprise appliance product includes a feature called an appliance marketplace, modeled after retail consumer application marketplaces such as online music, online movie and/or online app stores. In an enterprise appliance, the appliance marketplace provides an integrated market to purchase, install and/or update enterprise applications like for example Microsoft Exchange, Oracle, Sugar CRM, and so forth.

In one embodiment, pre-seeded metadata is used in the appliance marketplace for available applications that provides "hint" data regarding application requirements including but not limited to: CPU/processor/core utilization needs, network bandwidth, and storage latency. This information may be seeded based on initial expert knowledge in the market. Over time, as customer utilization of these applications increases, for example by downloading them and installing/running/updating them in test and production environments, performance and utilization information is gathered from the appliance and appliances with other customers. Aggregate data over an entire appliance customer base provides a feedback loop that can continuously update the appliance marketplace metadata about the appliance and/or applications in the appliance marketplace to be more accurate.

In one embodiment, this store metadata may in turn be utilized to notify one or more customers regarding their potential capacity planning needs at the time of application installation in a proactive manner.

Throughout this specification without limitation an "enterprise" is any organization for example a company, business, government, educational, religious, and/or non-profit entity. Throughout this specification without limitation an "enterprise application" is an application used to serve an enterprise/organization rather than simply an individual user and/or customer. Examples of enterprise applications include product catalog systems, security systems, enterprise content management (ECM) systems, billing systems, business intelligence (BI) systems, customer relationship management (CRM) systems, IT management systems, enterprise resource planning (ERP) systems, financial accounting systems, lead management systems, project management systems, forms automation systems, shopping portals, collaboration, business collaboration systems, human resource management (HRM) systems, manufacturing systems, distribution systems, payment processing systems, and/or enterprise application integration. Throughout this specification without limitation an "enterprise appliance" is an appliance used to serve an enterprise/organization rather than simply an individual user and/or customer. An example of an enterprise appliance is a hyper-converged appliance.

FIG. 1 is a block diagram illustrating an embodiment of an appliance and marketplace environment. In the example shown, an installed base of systems (e.g., computers, servers, appliances, devices, etc.) of a vendor are represented by systems 102, 104, and 106. For example, each system may comprise a rack in which one to n appliances may be inserted. Installed systems such as systems 102, 104, and 106 may include appliances or other hardware configured to use virtualization technologies to provide end users with access to functionality such as computation (e.g., processor and environments in which to run applications), data storage, network services, infrastructure management, and so forth. In the example shown, the systems 102 and 104 are indicated by dashed line 108 to be associated with a same customer of the vendor of systems 102, 104, and 106, such as an enterprise or other entity.

An administration console 110 is shown. In various embodiments, the administration console 110 may comprise a workstation or other computer used to run an management software associated with systems 102 and 104 and/or a browser used to access a cloud-based or other online application or service.

In the example shown, systems included in the installed base, represented in FIG. 1 by systems 102, 104, and 106, and admin consoles such as admin console 110, have corresponding connections via a network 112 to one or more backend systems. In the example shown, the backend systems include a performance and utilization data collection and analysis process that may comprise one or more servers 114 and/or server(s) that execute said process.

Each system in the installed base, e.g., systems 102, 104, and 106, may be configured to report statistics, e.g. via logs or other reports, via a secure connection to server 114. Server 114 stores raw and/or pre-processed log data in a log data store 116. For example, server 114 may extract relevant data from received logs and populate structured data stores, such as database or other tables, comprising log data 116. In some embodiments, a massively parallel processing (MPP) or other database system may be used.

In various embodiments, server 114 uses log data 116 to perform analyses, such as trend analysis of system performance and/or utilization, failure analysis, and/or other analysis of systems comprising the installed base. Such analysis may be performed with respect to individual systems, systems associated with a given customer, and/or across different customers. In the example shown, results of such analyses may be stored in an analyses data store 118. For example, health reports for individual systems and/or clusters of systems may be stored. In some embodiments, trend reports, comparative reports, failure analyses, and/or other analyses may be stored. In some embodiments, models may be generated by server 114 based on log data 116 and such models may be stored in data store 118. In some embodiments, such models may be used to perform predictive failure, capacity planning, and/or other analysis with respect to individual systems, clusters of systems, specific customers, and/or across customers.

In the example shown in FIG. 1, customers (e.g., administrative users) may access support services for installed systems, such as systems 102, 104, and 106, via a cloud-based, remote, and/or distributed support service 120. Traditionally, support services have been provided via processing performed locally at and/or data stored locally at the installed systems themselves. An application running locally on the installed system(s) and/or a computer associated therewith interacted with the systems to generate and provide utilization and performance statistics, for example. In the system shown in FIG. 1, in some embodiments support services may be access via cloud-based support service 120. Support may be provided using data stored at a backend storage system, such as log data 116 and analyses 118.

In the example shown, a customer, e.g., an administrative user of admin console 110, may access cloud-based support service 120. A look up may be performed in an account profile data store 122 to determine a service level to which the customer has subscribed. Support services may be provided in a manner and/or to an extent determined based at least in part on the service level to which the customer has subscribed. For example, a web browser-based interface may be provided in which only support services and/or features to which the customer is to have access based on the customer's subscription may be displayed and/or made accessible. The cloud-based support service 120 may interact, as needed, via a network or other connection 124 with one or more of server 114, log data store 116, and/or analyses store 118 to provide the services associated with the service level to which the customer has subscribed.

In one embodiment, differential levels of support service based on customer subscriptions are provided. Examples of differential levels of service which may be provided in various embodiments include, without limitations, service levels that include one or more of the following: online form to request service on a fee-for-service basis; online form to request service that has been prepaid and/or is included at no additional charge in the customer's subscription; on demand access to support personnel of a collective ecosystem of vendor and vendor partners (throughout this specification, without limitation the collective ecosystem will be referred to by the term "vendor"), e.g., by phone or via online chat; reports reflecting the performance, utilization, etc. of the customer's own systems; reports comparing the performance and utilization of the customer's systems with those of a relevant cohort, e.g., across customers, such as customers determined by some criteria to be similar to the requesting customer; access to analyses, such as trend analyses, failure analyses, failure predictions, capacity planning projections, etc.; and access to knowledge base articles (e.g., stored in knowledge base 126) relevant to a topic in which the customer has expressed interest and/or which is determined programmatically to be relevant to the customer, e.g., based on analysis of the customer's performance and/or utilization information. In various embodiments, for each service subscription level, one or more of the above service features and/or one or more other services may be included in that level. Filters may be defined and implemented at the cloud-based support service, such as service 120 in the example shown in FIG. 1, to ensure each customer receives support at a level and/or in a manner associated with the service level to which that customer has subscribed. For example, customers who contract for the most basic level of support may be provided with an interface, such as a form, to request support on a fee-for-service basis, while customers who contract for a next higher level of support may in addition have access to reports reflecting the health and use of their own installed systems, and customers who contract for a next higher still level of support may be provided access to knowledge base articles, more immediate online support, e.g., via online chat, and/or reports based on analyses across customers.

In the example shown in FIG. 1, customers (e.g., administrative users) may access resources for installed systems, such as systems 102, 104, and 106, via a cloud-based, remote, and/or distributed resource server(s) 130. Cloud-based resource servers 130 include larger scale computational resources 130, larger scale memory resources 130, larger scale network resources 130, larger scale storage resources 132, and/or larger scale management resources 130. Traditionally, computational/memory/network/storage/management resource services have been provided locally with the appliances 102, 104, and 106. In the system shown in FIG. 1, in some embodiments local resources may enhanced, tiered, and/or replaced via cloud-based resource servers 130. For example if appliance 102 runs out of storage capacity, a customer 108 may procure additional cloud-based storage 132 via cloud-based resource server 130 at the same or different tier of price, performance, availability, speed, and/or latency. The cloud-based resource servers 130 may interact, as needed, via a network or other connection 124 with one or more of server 114, log data store 116, analyses store 118 and/or cloud-based support service 120 to provide the resources to which the customer has subscribed and/or purchased.

Figure 2:
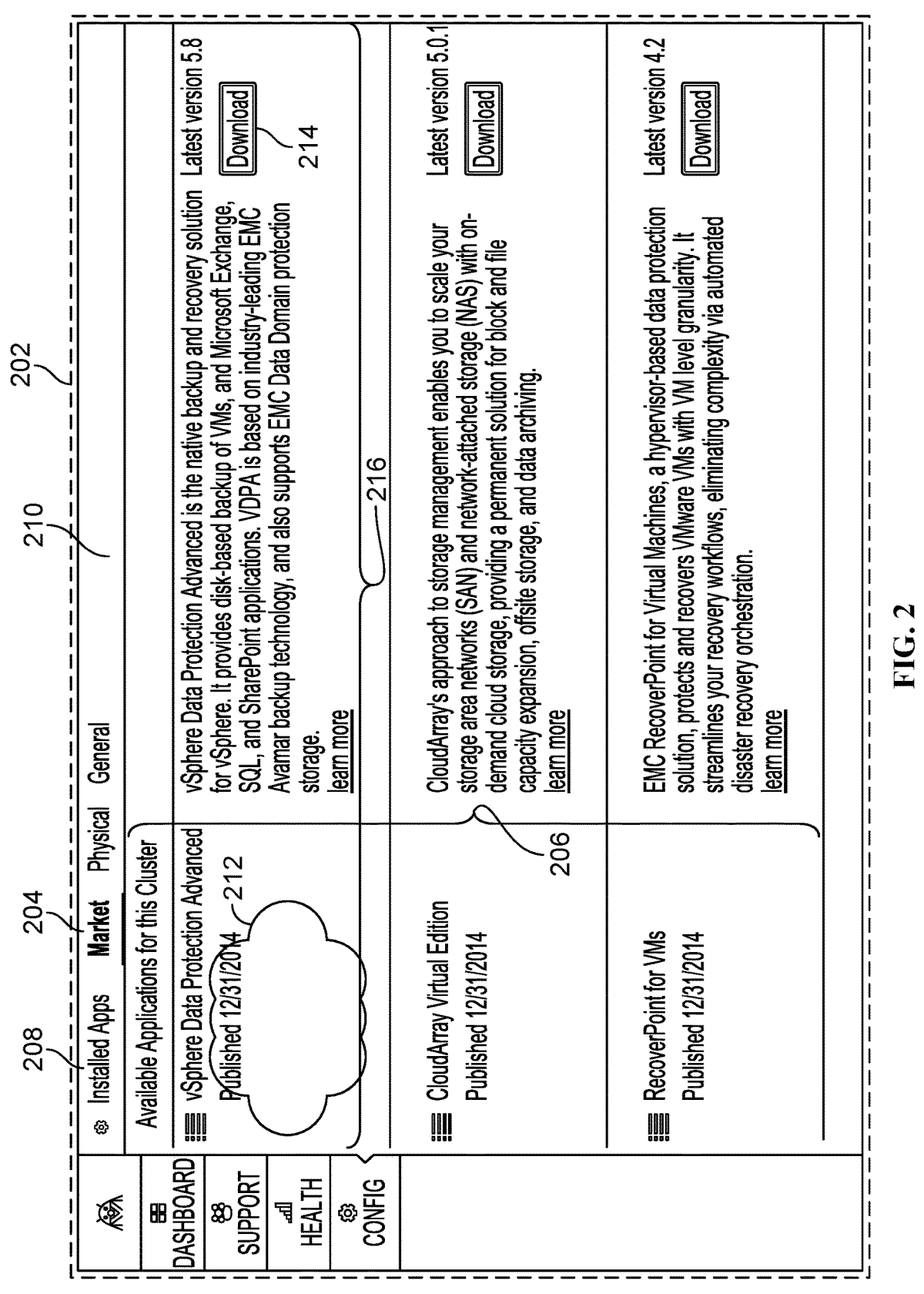

FIG. 2 is an illustration of an appliance marketplace. In one embodiment, user interface is all provided web-based pages and/or forms on admin console 110 and other local/remote sessions for administrative users associated with customer 108.

In the example shown in FIG. 2, the appliance marketplace is shown as a tab 204 of a web-based dashboard and/or console 202. The appliance marketplace tab 204 includes a listing 206 available applications for the appliance 102/104 and/or cluster 108. The web-based dashboard 202 may also include a list of already installed applications 208.

For each listing entry 216 of the appliance marketplace listing 206, a name and description is given of the application, including for example version information and a link to learn more 210, Other possible information associated with a listing 206 includes a status information of the application, requirements specification, and/or link to pricing 212, and one or more user-action elements such as a "download", "update", "subscribe", "install", and/or "purchase" button 214.

In one embodiment, if a customer selects a user-action element 214 for a new application 216 and the requirements specification 212 is larger than the available customer 108 resources or appliance 102 resources by a threshold, the vendor 114 suggests increasing capacity in the appropriate resource dimension, for example computational capacity, memory capacity, storage capacity, network capacity and/or management capacity.

Figure 3:
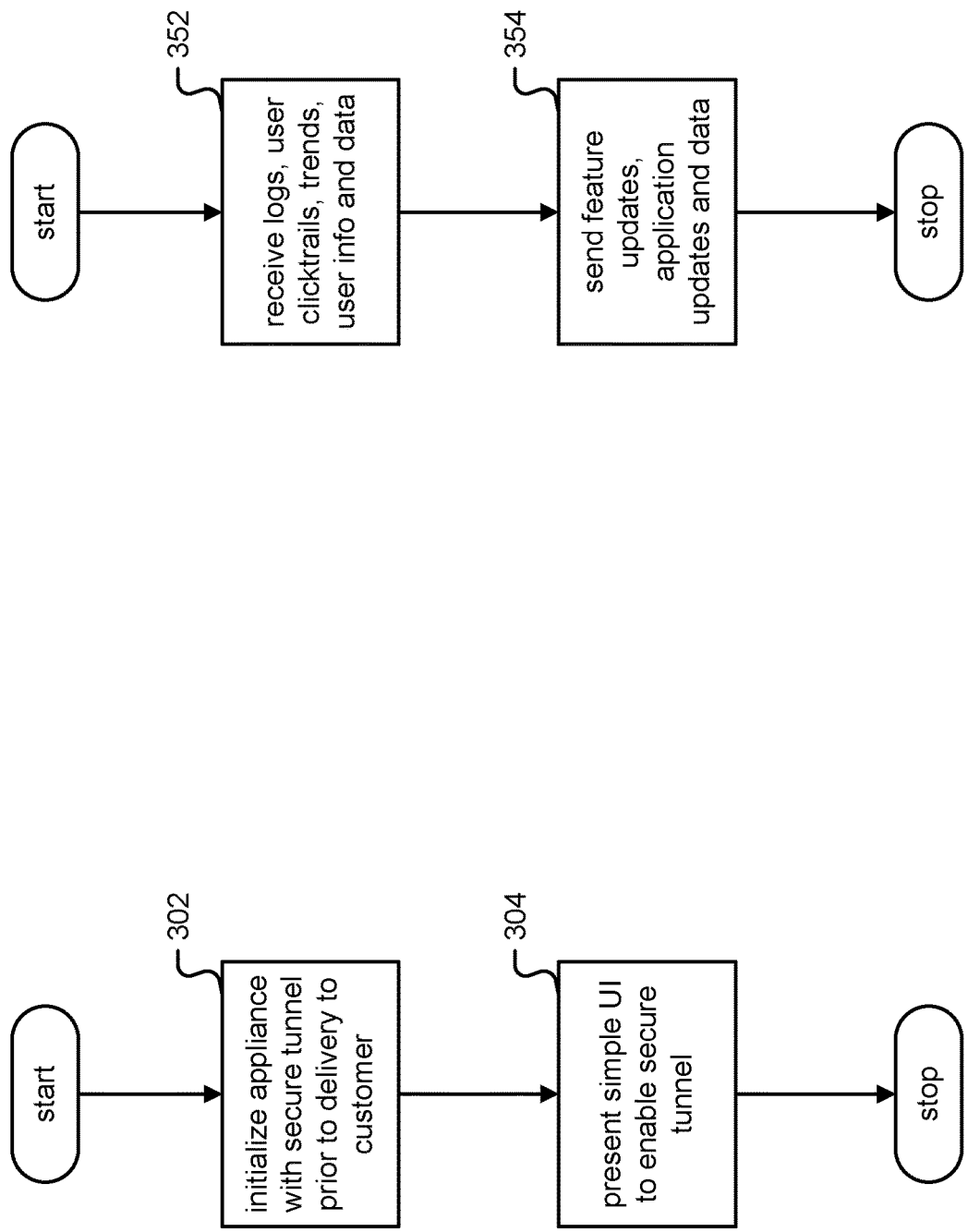
FIG. 3A is a flow chart illustrating an embodiment of a process for receiving usage and performance data.
FIG. 3B is a flow chart illustrating an embodiment of a process for receiving and sending secure tunnel data.

FIG. 3A is a flow chart illustrating an embodiment of a process for receiving usage and performance data. In one embodiment, the process of FIG. 3A may be established via a user interface, for example admin console 110.

In step 302, prior to delivery to customer 108, the vendor of appliances 102/104/106 initializes an appliance, for example appliance 104, with a secure tunnel from cluster 108 and/or appliance 104 to vendor server 114. Examples of a protocol/standard for a secure tunnel includes secure remote support protocols such as those over SSL such as HTTPS. In one embodiment, the secure tunnel is bi-directional and persistent.

In step 304, a simple user interface is presented to customer 108 upon installation to enable a secure tunnel in part to gather usage and performance data and/or commence gathering of said data. In one embodiment, there is no or little technical expertise required on the part of the user for customer 108 to enable the secure tunnel and/or commence gathering. In one embodiment the user provides a single UI assertion such as a single click to enable the secure tunnel and/or commence gathering. In one embodiment the user is assured that gathered data will not present privacy endangerment and/or data will be gathered in aggregate. In one embodiment the user need not provide a UI assertion to enable the secure tunnel and/or commence gathering as it is the default action of an initialization screen/page.

FIG. 3B is a flow chart illustrating an embodiment of a process for receiving and sending secure tunnel data. In one embodiment, the process of FIG. 3A is carried out by vendor server 114 in FIG. 1. In one embodiment, receiving and sending secure tunnel data is performed using a bi-directional secure tunnel, for example an ESRS tunnel.

In step 352, the vendor server 114 receives logs, user clicktrails, trends, user information, and other data from one or more appliances 102/104/106 from one or more customers 108/106. Throughout this specification, 'clicktrails' are without limitation include clickstream and/or click path data that include records of where and when a user asserts the user interface while interfacing with the system. Clicktrails can include logs of where/when a user clicks, where/when a user views the UI display, and/or includes use of tracking cookies.

Step 352 may be carried out with a plurality of customers. By gathering broad and/or aggregate information, trends may be detected and analyzed in server 114 to provide better customer service to customers 108/106.

In step 354, the vendor server 114 transmits feature updates, application updates, and other data to one or more appliances 102/104/106 from one or more customers 108/106. In one embodiment said updates are in response to data gathered in step 352.

Figure 4:
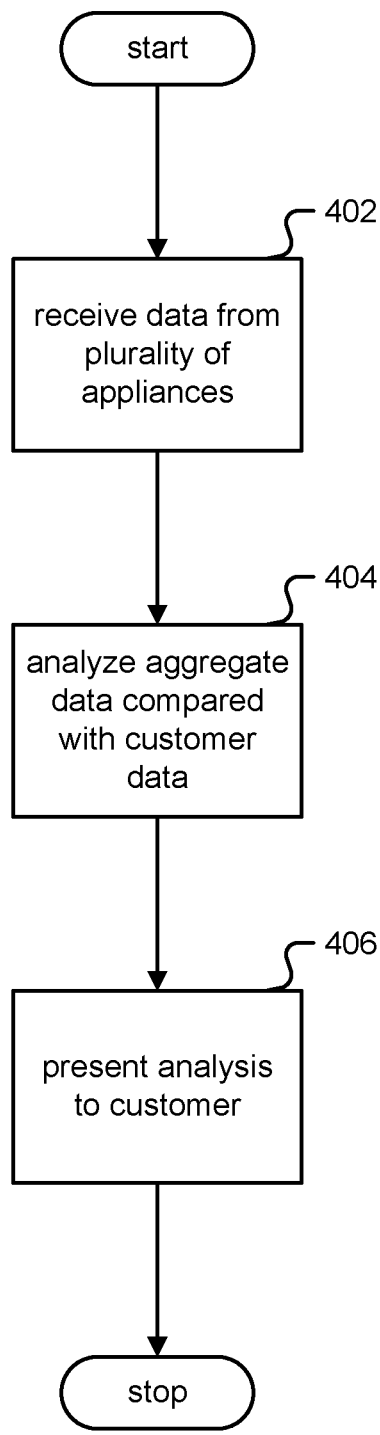
FIG. 4 is a flow chart illustrating an embodiment of a process for offsite analysis.

FIG. 4 is a flow chart illustrating an embodiment of a process for offsite analysis. Throughout this specification "offsite" refers to any location not local to a customer, for example the area outside the dashed line rectangle of customer 108 in FIG. 1. In one embodiment, the process of FIG. 4 is carried out by vendor server 114 in FIG. 1. The process may take place on-demand, in response to a trigger, periodically or continually.

In step 402, data is received from a plurality of appliances 102/104/106. The data may be received via a network. The data may be usage and/or performance data. The data may be received from a plurality of installed appliances, a different corresponding subset of said appliances being associated with each of a plurality of customers.

In step 404, aggregate data is analyzed and compared with customer data. In one embodiment, the analysis is performed across customers 106/108. In one embodiment, the analysis identifies capacity utilization related trends across customers and/or for a given customer 108.

In one embodiment, a set of one or more appliance resources required to support an application workload is determined based at least in part on usage and performance data from the plurality of installed appliances. In one embodiment, the application workload is a virtualized application workload. Throughout this specification "virtualization" refers to virtual machines and/or containerized applications, for example logical machines and/or specific applications abstracted from actual/physical machines in software or otherwise. Virtualized applications include application run on virtual machines for example those running on an appliance configured to use virtualization technologies.

In one embodiment, a determination is made, based at least in part on an analysis of appliance usage and performance data received from a given customer 108, for an amount of unutilized capacity available with respect to one or more appliance resources.

In one embodiment, analysis of appliance usage and performance data from a given customer 108 is compared to and/or analyzed with respect to the aggregate appliance usage and performance data from all or a majority of customers 108/106.

In one embodiment, a determination is made, based at least in part on an amount of unutilized capacity available with respect to one or more appliance resources for the given customer 108 and a set of one or more appliance resources required to support a (virtualized) application workload, as to whether the given customer's 108 currently available resources are sufficient to support said virtualized application workload.

In one embodiment, a targeted offer is determined for a given customer 108. The targeted offer determined is based at least in part on said analysis across customers 106/108 and the 108 given customer's own usage and performance data.

In step 406, analysis is presented to a customer, either in a passive manner such as an addition, update, and/or deletion of an appliance marketplace listing entry 216 in FIG. 2, or in an active manner such as a pop-up, message and/or window on a display, or out-of-band communication such as an email message, SMS text message, hangouts message, phone message, and so forth. For example, for a CRM application listing entry 216, the resources as determined by step 404 may be updated from the CRM's vendor default of a requirement of two cores and/or 1 GB memory and/or 2 TB storage and/or 500 kbps network requirements to a revised analysis of two cores and/or 0.5 GB memory and/or 3 TB storage and/or 750 kbps network requirements, and reflected in the associated requirements specification 212 for the 206 listing.

In one embodiment, the workload may be virtualized workload, for example an application running in a virtual machine on one or more nodes of one or more appliances 102/104. In one embodiment, an application with which a virtualized application workload is associated is automatically selected for offer and/or download and/or install to the customer. For example if customer 108 appliances have recently changed resources, a new application may be a more efficient choice for a given virtualized application workload reflecting the recently changed resources.

In one embodiment the selection is only noted at the vendor, for example vendor server 114, and not explicitly communicated to the customer 108, to prepare/prime vendor resources without yet requiring a commitment from a customer 108, for example for higher availability or budget/scheduling. In one embodiment, the selection is consummated by default by a customer 108, for example a customer 108 may have a standing directive to approve any server 114 driven selection of an application with which a virtualized application workload is associated for any applications less than a monthly budget of $2,000.

In one embodiment, a periodic or consistent reception of performance and usage data from a customer 108 permits ongoing updates to proactive appliance resource requirements for a given virtualized application workload. That is, requirements specification 212 may update on a periodic or continual basis.

Figure 5A:
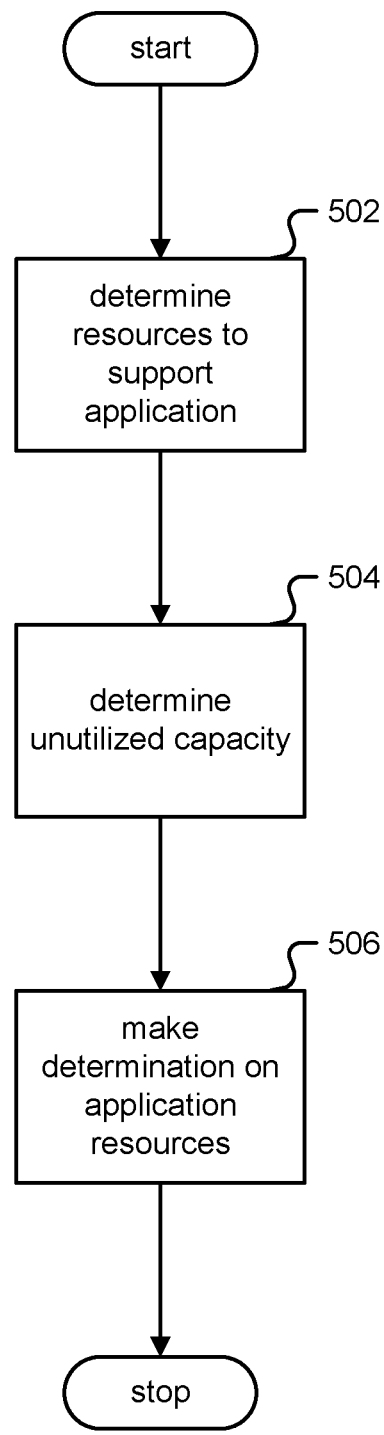
FIG. 5A is a flow chart illustrating an embodiment of a process for auto selection of applications based on resource capacity.

FIG. 5A is a flow chart illustrating an embodiment of a process for auto selection of applications based on resource capacity. In one embodiment, the process of FIG. 5A is carried out by server 114 and part of step 404 and/or step 406 of FIG. 4. The process may take place on-demand, in response to a trigger, periodically or continually.

In step 502, usage and performance data from the plurality of installed appliances 102/104/106 from a plurality of customers is analyzed. A set of one or more appliance resources required to support a virtualized application's workload is determined based on the data from the plurality of installed appliances/customers.

In step 504, usage and performance data from an appliance (or cluster of appliances) from a given customer 108, for example appliance 102, is analyzed to determine unutilized capacity. For example, an amount of unutilized capacity available with respect to one or more appliance resources on the given customer 108/appliance 102 is determined.

In step 506, a determination is made on whether the 108 given customer's currently available resources are sufficient to support one or more virtualized application's workload. In one embodiment, the steps of FIG. 5 are made periodically as more data is gathered from the plurality of appliances 102/104/106 and/or the plurality of customers 106/108.

Figure 5B:
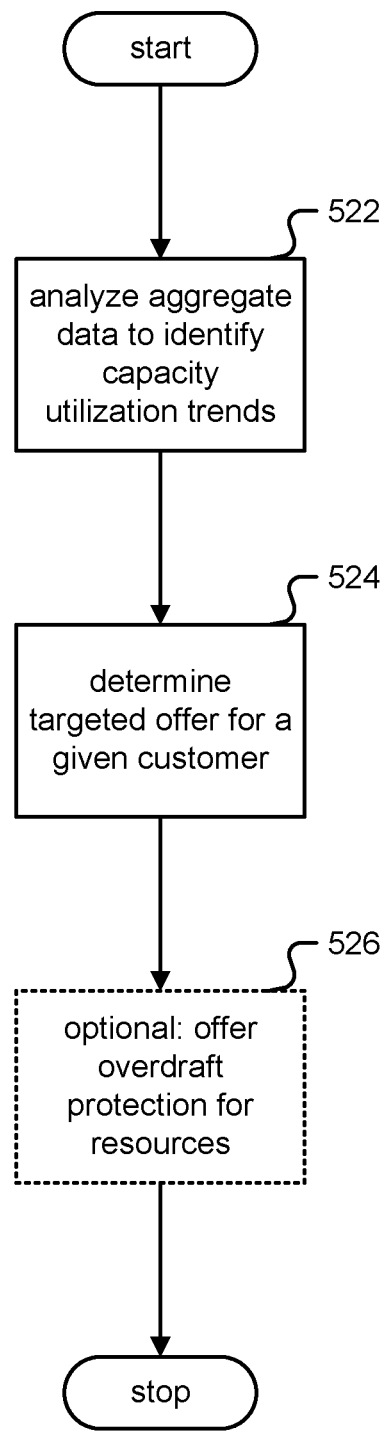
FIG. 5B is a flow chart illustrating an embodiment of a process for overdraft protection for resources.

FIG. 5B is a flow chart illustrating an embodiment of a process for overdraft protection for resources. In one embodiment, the process of FIG. 5B is carried out by server 114 and part of step 404 and/or step 406 of FIG. 4. Throughout this specification 'overdraft protection for resources' is analogous to 'overdraft protection' in the retail banking industry also known as 'bounce protection', wherein a customer runs out, sometimes unexpectedly, of financial resources in one account (for example a checking account), and thus a bank vendor's overdraft protection quickly applies financial resources from either another customer's account (for example a savings account, a credit card, and/or a certificate of deposit) or from an account owned by a third-party like the bank vendor itself. The process may take place on-demand, in response to a trigger, periodically or continually.

With regards to appliance resources such as computational resources, memory resources, storage resources, a vendor may apply a vendor's cloud resources on server 130 and/or storage resources 132 to a given customer 108 in a 'just-in-time' or proactive manner, as overdraft protection for resources.

For example, consider that it is observed on Mondays there is a surge at 9 am for an office building's email servers 102 at customer 108 because of a spike in checking email from nearly every employee at that time. Overdraft protection for resources, in some cases based on the techniques shown in FIG. 4 and/or FIG. 5B, may set up a cloud email server 130 to handle the 'overdraft' or over taxing of resources from local node 102.

In step 522, usage and performance data from the plurality of installed appliances 102/104/106 from a plurality of customers 106/108 is analyzed. A set of one or more appliance resources required to support a virtualized application's workload is determined based on the data from the plurality of installed appliances/customers.

In one embodiment, usage and performance data is analyzed at a cluster level of one or more appliances. Throughout this specification 'cluster' refers to a computer cluster of a set of coupled appliances (for example 102, 104 in FIG. 1) that work together and in at least one aspect can be viewed as a single system through virtualization or other technology.

In one embodiment, usage and performance data is analyzed at a node level. Throughout this specification 'node' refers to a basic device as part of an appliance. For example an appliance 102 may comprise a plurality of nodes. In one embodiment, 2U high appliances comprised of four nodes are used.

In one embodiment, each appliance 102 is of a hyper-converged infrastructure, such that each appliance includes compute, storage, network, and management capability.

In step 524, a targeted offer is determined for a given customer 108. In one embodiment, the targeted offer is based at least in part on said analysis between aggregated data from a plurality of customers 106/108 and the 108 given customer's own usage and performance data. In one embodiment, this step of determining for the given customer 108 the targeted offer is also based at least in part on a "customer environment" 104, 110 apart from the customer's appliance 102.

In one embodiment the targeted offer is to offload workload, for example application compute workload, application memory workload, application storage workload, application network workload, and/or application management workload to a cloud resource server 130 and/or cloud storage 132. In one embodiment the targeted offer is to offload workload with an additional appliance 104: the additional appliance 104 may already be on premises and underutilized, or the additional appliance 104 may be at the vendor and need to be purchased.

In one embodiment the targeted offer is presented to a customer, either in a passive manner such as an addition, update, and/or deletion of an appliance marketplace listing entry 216 in FIG. 2, or in an active manner such as a pop-up, message and/or window on a display, or out-of-band communication such as an email message, SMS text message, hangouts message, phone message, and so forth. For example, the targeted offer is presented as a proactive recommendation based on customer 108 statistics as compared with statistics aggregated across customers 106/108. In one embodiment the targeted offer is only noted at the vendor, for example vendor server 114, and not explicitly communicated to the customer 108, to prepare/prime vendor resources without yet requiring a commitment from a customer 108, for example for higher availability or budget/scheduling.

An optional step shown in a dashed line on FIG. 5B is step 526, which is to offer overdraft protection for resources based on the analysis in step 522. If for example, the last Mondays have been getting steadily more taxing on local email server 102, vendor and/or vendor server 114 may offer overdraft protection for resources, and in some cases in particular for email service to customer 108. In one embodiment a customer 108 at any time may take the initiative to seek overdraft protection for resources for any appliance 102/104 and for any and all services, for example for service dimension like computational, memory, storage, network, management, and so forth; and/or for example for service protocol like email service, file service, authentication services, collaboration services, and so forth.

In one embodiment overdraft protection for resources is invoked based on a location and/or time determined by the analysis in step 522. In one embodiment overdraft protection for resources once offered and acceptance is based on a threshold setting set by customer 108 and/or utility server 114.

Figure 5C:
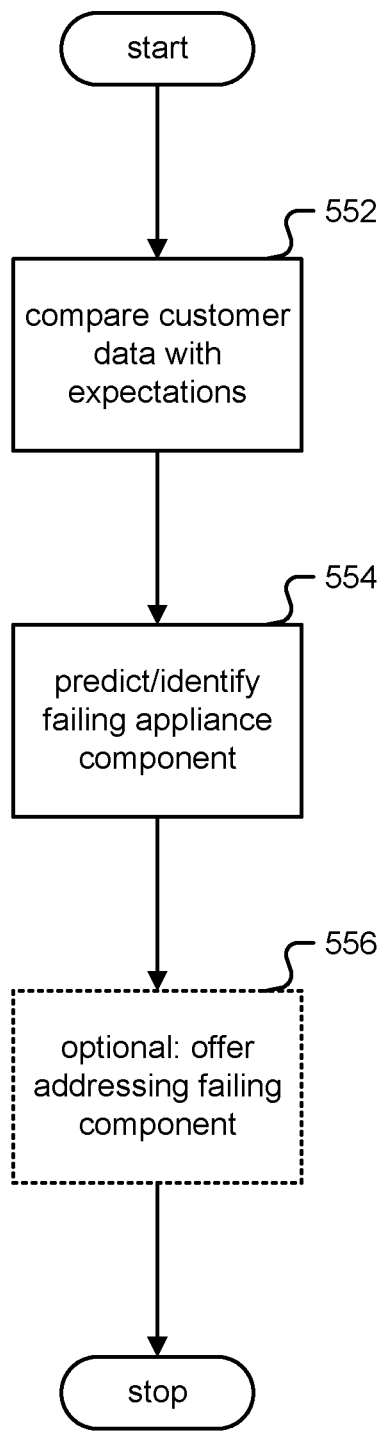
FIG. 5C is a flow chart illustrating an embodiment of a process for proactive appliance maintenance.

FIG. 5C is a flow chart illustrating an embodiment of a process for proactive appliance maintenance. In one embodiment, the process of FIG. 5C is carried out by server 114 and part of step 404 and/or step 406 of FIG. 4. The process may take place on-demand, in response to a trigger, periodically or continually.

Good customer service includes not only prompt repair and maintenance of appliances 102/104/106 but also proactive measures as the adage goes; "an ounce of prevention is worth of cure". Offsite data analysis allows for proactive appliance maintenance.

In step 552, usage and performance data from the plurality of installed appliances 102/104/106 from a plurality of customers 106/108 is analyzed, to determine if an appliance and/or its components from one customer 108 is failing. In one embodiment, one or more hardware and/or software components are analyzed for failure. In one embodiment, customer data is compared with static and/or heuristic expectations from a manufacturer or third-party. In one embodiment, customer data is compared with static and/or dynamic aggregated data from the plurality of installed appliances 102/104/106 from a plurality of customer 106/108.

In step 554, based upon the analysis of step 552, the server 114 predicts and/or identifies failing appliance components, if any. For example, based on slowly rising temperature and/or wind speed detector metrics, a server 114 may detect a fan is failing before it fails. In one embodiment, comparison in step 552 with dynamic aggregated data may help identify systemic weakness and/or failure of software components against an ever-changing internet with varying protocols, security threats, usage trends, and/or user interest.

An optional step shown in a dashed line on FIG. 5C is step 556, which is to offer proactively addressing the failing component to the customer 108. In one embodiment the proactive offer is presented to a customer, either in a passive manner such as an addition, update, and/or deletion of an appliance marketplace listing entry 216 in FIG. 2, or in an active manner such as a pop-up, message and/or window on a display, or out-of-band communication such as an email message, SMS text message, hangouts message, phone message, and so forth. For example, the proactive offer may suggest offering to order a failing fan as predicted in step 554. In one embodiment the proactive offer is only noted at the vendor, for example vendor server 114, and not explicitly communicated to the customer 108, to prepare/prime vendor inventory without yet requiring a commitment from a customer 108, for example for inventory management. In one embodiment, the proactive offer is consummated by default by a customer 108, for example a customer 108 may have a standing directive to approve any server 114 driven proactive order for any parts less than $500.

Figure 5D:
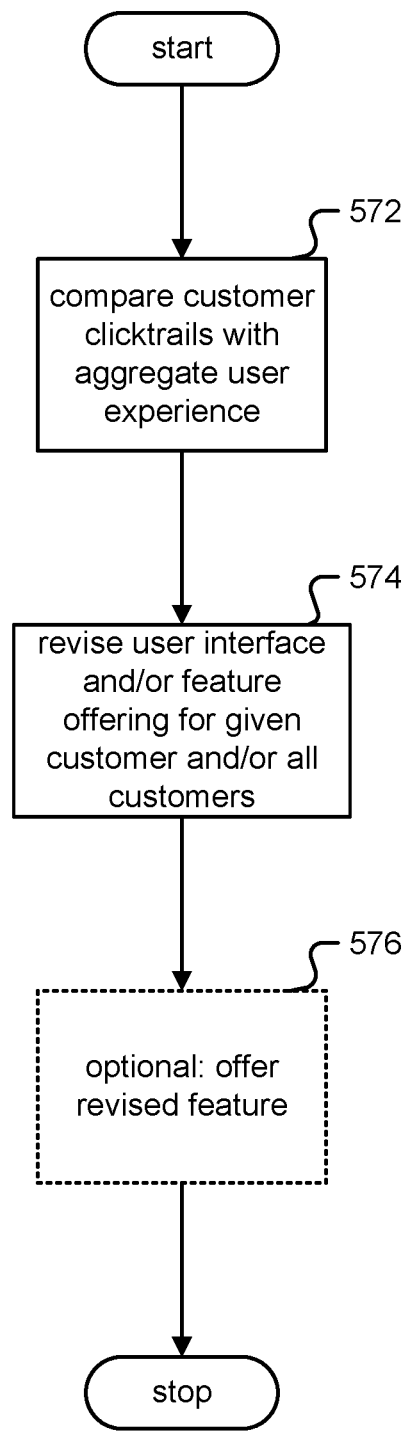
FIG. 5D is a flow chart illustrating an embodiment of a process for proactive user experience improvement.

FIG. 5D is a flow chart illustrating an embodiment of a process for proactive user experience improvement. In one embodiment, the process of FIG. 5D is carried out by server 114 and part of step 404 and/or step 406 of FIG. 4. The process may take place on-demand, in response to a trigger, periodically or continually.

Good customer service includes responding to and/or learning from past user experience with an appliance 102 and/or features of the associated systems of appliance 102, for example a dashboard as shown in FIG. 2. Offsite data analysis allows for proactive user experience improvement.

In step 572, usage and performance including clicktrail data from the plurality of installed appliances 102/104/106 from a plurality of customers 106/108 is analyzed, to determine if an appliance and/or its features from one customer 108 may be improved. In one embodiment, clicktrail data in aggregate is taken to a user interface and/or user experience specialist for manual analysis. In one embodiment, 108 customer data is compared with static and/or heuristic expectations from a manufacturer or third-party. In one embodiment, 108 customer data is compared with static and/or dynamic aggregated data from the plurality of installed appliances 102/104/106 from a plurality of customer 106/108.

In step 574, based upon the analysis of step 572, the server 114 highlights bottlenecks, abandoned features, well-used features, and/or other points for improvement of user experience to a specialist for analysis. The analysis reviews both aggregate clicktrails as well as customer 108 clicktrails to determine a revision for the user experience/UI, if any. Revisions may include addition of features, changing features, and/or eliminating features on one customer 108 appliance or for a plurality or all customers. The comparison may take place dynamically to address changing users and/or user experience trends.

An optional step shown in a dashed line on FIG. 5D is step 576, which is to offer proactively addressing revised feature to the customer 108. In one embodiment the revised feature offer is presented to a customer, either in a passive manner such as an addition, update, and/or deletion of an appliance marketplace listing entry 216 in FIG. 2, or in an active manner such as a pop-up, message and/or window on a display, or out-of-band communication such as an email message, SMS text message, hangouts message, phone message, and so forth. In some cases the revised feature may be a 'free upgrade' or version upgrade/update. In some cases the revised feature may be a 'major upgrade' requiring purchase. In one embodiment the revised feature offer is only noted at the vendor, for example vendor server 114, and not explicitly communicated to the customer 108, to prepare/prime beta testing without yet requiring a commitment from a customer 108. In one embodiment, the revised feature offer is consummated by default by a customer 108, for example a customer 108 may have a standing directive to approve any server 114 driven revised upgrade/update for any features less than $200.

Figure 6:
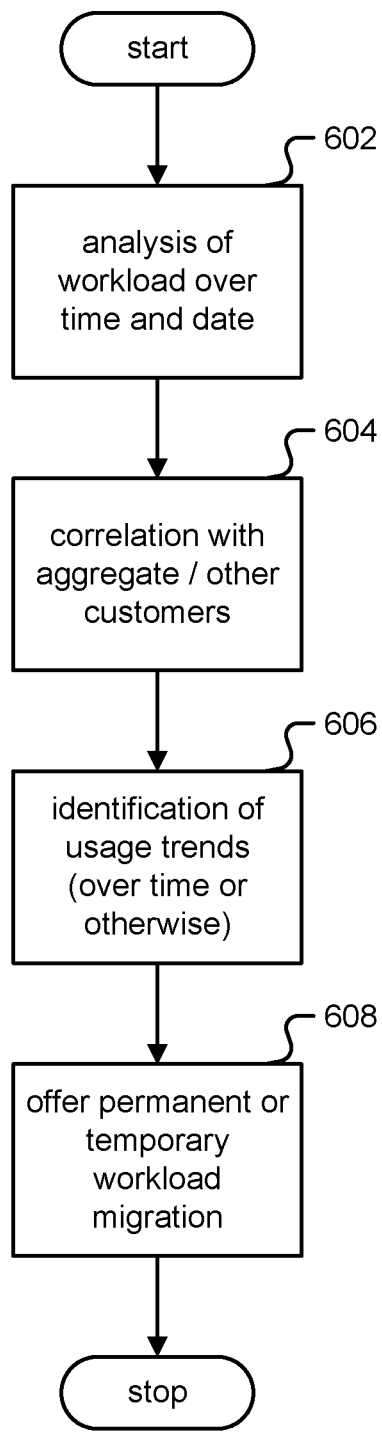
FIG. 6 is a flow chart illustrating an embodiment of a process for workload migration.

FIG. 6 is a flow chart illustrating an embodiment of a process for workload migration. In one embodiment, the process of FIG. 6 is carried out by server 114 and part of step 404 and/or step 406 of FIG. 4. The process may take place on-demand, in response to a trigger, periodically or continually for one or more applications running on an appliance 102.

In step 602, an analysis of application workload over time/date for an appliance 102 is performed. In one embodiment, logs are analyzed in part to perform the analysis. In step 604, a correlation is performed to compare the analysis in step 602 with that of other customer, for example aggregating customers 106/108.

In step 606, the analysis and correlation of step 602 and 604 respectively is used to identify usage trends of resources of the appliance 102, over time or otherwise. Short-term analysis identifying acute issues and/or long-term analysis identifying chronic issues may be performed. Long-term analysis may also capture external trends such as changing security issues, general user consumption trends, and/or growth of the enterprise/customer 108.

In step 608, based on the identification of trends in step 606, permanent and/or temporary workload migration is offered. In one embodiment the offer is to migrate workload, for example application compute workload, application memory workload, application storage workload, application network workload, and/or application management workload to a cloud resource server 130 and/or cloud storage 132. In one embodiment the migrate offer is to migrate workload with an additional appliance 104: the additional appliance 104 may already be on premises and underutilized, or the additional appliance 104 may be at the vendor and need to be purchased.

The migration offer may be presented to a customer, either in a passive manner such as an addition, update, and/or deletion of an appliance marketplace listing entry 216 in FIG. 2, or in an active manner such as a pop-up, message and/or window on a display, or out-of-band communication such as an email message, SMS text message, hangouts message, phone message, and so forth. In one embodiment, the migration offer is consummated by default by a customer 108, for example a customer 108 may have a standing directive to approve any migration to cloud for less than $800.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    initializing an appliance with a secure bi-directional tunnel prior to delivery to a given customer;
    providing an appliance marketplace for the given customer to purchase, install, and/or update enterprise applications;
    receiving, via a network, a first usage and performance data of an enterprise application associated with the appliance marketplace from a first installed appliance associated with a first customer and a second usage and performance data of the enterprise application from a second installed appliance associated with a second customer;
    analyzing the first usage and performance data and the second usage and performance data to identify capacity utilization related trends, comprising:
        analyzing the first usage and performance data and the second usage and performance data to determine a set of one or more appliance resources required to support a workload of a virtualized application;
        analyzing the first usage and performance data and the second usage and performance data to determine unutilized capacity; and
        determining whether currently available resources are sufficient to support a workload of one or more virtualized application based on the set of one or more appliance resources required and the determined unutilized capacity;
    determining for the given customer a targeted offer, based at least in part on said analysis and the given customer's own usage and performance data, wherein the targeted offer includes an offer to offload application compute workload, application memory workload, application storage workload, application network workload, application management workload, or any combination thereof to a cloud resource server, a cloud storage, or both; and offering overdraft protection for resources based at least in part on said analysis, comprising:

performing one or more of the following:

offering overdraft protection for a particular appliance resource at a particular time;

offering overdraft protection and accepting the overdraft protection based on a threshold setting set by the given customer, a utility server, or both; and/or invoking overdraft protection based on a location, a time, or both based on the analyzing of the first usage and performance data and the second usage and performance data.

2. The method of claim 1, wherein the analysis of said usage and performance data across customers to identify capacity utilization related trends is performed offsite.

3. The method of claim 2, wherein determining for the given customer the targeted offer is also based at least in part on "customer environment" apart from the customer's appliance(s).

4. The method of claim 3, wherein usage and performance data is analyzed at a cluster level of one or more appliances.

5. The method of claim 4, wherein usage and performance data is analyzed at a node level, wherein each appliance is comprised of one or more nodes.

6. The method of claim 5, wherein the appliance is hyper-converged infrastructure; includes compute, storage, network, and management capability.

7. The method of claim 1, further comprising invoking overdraft protection for resources based at least in part on said analysis across customers and the given customer's own usage and performance data or a threshold setting.

8. The method of claim 7, further comprising offering proactive maintenance of appliance components.

9. The method of claim 8, further comprising ordering an appliance component based at least in part on said analysis across customers and the given customer's own usage and performance data.

10. The method of claim 9, further comprising comparing clicktrails to revise features.

11. The method of claim 10, wherein comparing clicktrails includes highlighting one or more of the following: bottlenecks, abandoned features, and well-used features.

12. The method of claim 11, further comprising offering workload migration.

13. The method of claim 12, wherein offering workload migration includes offering to purchase cloud resources and offering to purchase a new appliance.

14. A system, comprising:

a processor configured to:

receive an initialization of a secure bi-directional tunnel prior to delivery to a given customer;

provide an appliance marketplace for the given customer to purchase, install, and/or update enterprise applications;

receive, via a network, a first usage and performance data of an enterprise application associated with the appliance marketplace from a first installed appliance associated with a first customer and a second usage and performance data of the enterprise application from a second installed appliance associated with a second customer;

analyze the first usage and performance data and the second usage and performance data to identify capacity utilization related trends, comprising to:

analyze the first usage and performance data and the second usage and performance data to determine a set of one or more appliance resources required to support a workload of a virtualized application;

analyze the first usage and performance data and the second usage and performance data to determine unutilized capacity; and determine whether currently available resources are sufficient to support a workload of one or more virtualized application based on the set of one or more appliance resources required and the determined unutilized capacity;

determine for the given customer a targeted offer, based at least in part on said analysis and the given customer's own usage and performance data, wherein the targeted offer includes an offer to offload application compute workload, application memory workload, application storage workload, application network workload, application management workload, or any combination thereof to a cloud resource server, a cloud storage, or both; and offer overdraft protection for resources based at least in part on said analysis, comprising to:

perform one or more of the following:

offer overdraft protection for a particular appliance resource at a particular time;

offer overdraft protection and accepting the overdraft protection based on a threshold setting set by the given customer, a utility server, or both; and/or invoke overdraft protection based on a location, a time, or both based on the analyzing of the first usage and performance data and the second usage and performance data; and a memory coupled to the processor and configured to provide the processor with instructions.

15. A computer program product, the computer program product being embodied in a non-transitory computer readable storage medium and comprising computer instructions for:

receiving an initialization of a secure bi-directional tunnel prior to delivery to a given customer;

providing an appliance marketplace for the given customer to purchase, install, and/or update enterprise applications;

receiving a first usage and performance data of an enterprise application associated with the appliance marketplace from a first installed appliance associated with a first customer and a second usage and performance data of the enterprise application from a second installed appliance associated with a second customer;

analyzing the first usage and performance data and the second usage and performance data to identify capacity utilization related trends, comprising:

analyzing the first usage and performance data and the second usage and performance data to determine a set of one or more appliance resources required to support a workload of a virtualized application;

analyzing the first usage and performance data and the second usage and performance data to determine unutilized capacity; and determining whether currently available resources are sufficient to support a workload of one or more virtualized application based on the set of one or more appliance resources required and the determined unutilized capacity;

determining for the given customer a targeted offer, based at least in part on said analysis and the given customer's own usage and performance data, wherein the targeted offer includes an offer to offload application compute workload, application memory workload, application storage workload, application network workload, application management workload, or any combination thereof to a cloud resource server, a cloud storage, or both; and offering overdraft protection for resources based at least in part on said analysis, comprising:
performing one or more of the following:
offering overdraft protection for a particular appliance resource at a particular time;
offering overdraft protection and accepting the overdraft protection based on a threshold setting set by the given customer, a utility server, or both; and/or
invoking overdraft protection based on a location, a time, or both based on the analyzing of the first usage and performance data and the second usage and performance data.

* * * * *